INVENTOR.
RAYMOND J. GOOD
BY Ely, Pearne & Gordon
ATTORNEYS 3,197,549
COVER ASSEMBLY FOR AN OUTLET BOX AND
SUPPORTING WALL MAT THEREFOR
Raymond J. Good, 1504 Highland Ave., Lakewood, Ohio
Filed June 22, 1962, Ser. No. 204,385
4 Claims. (Cl. 174—66)

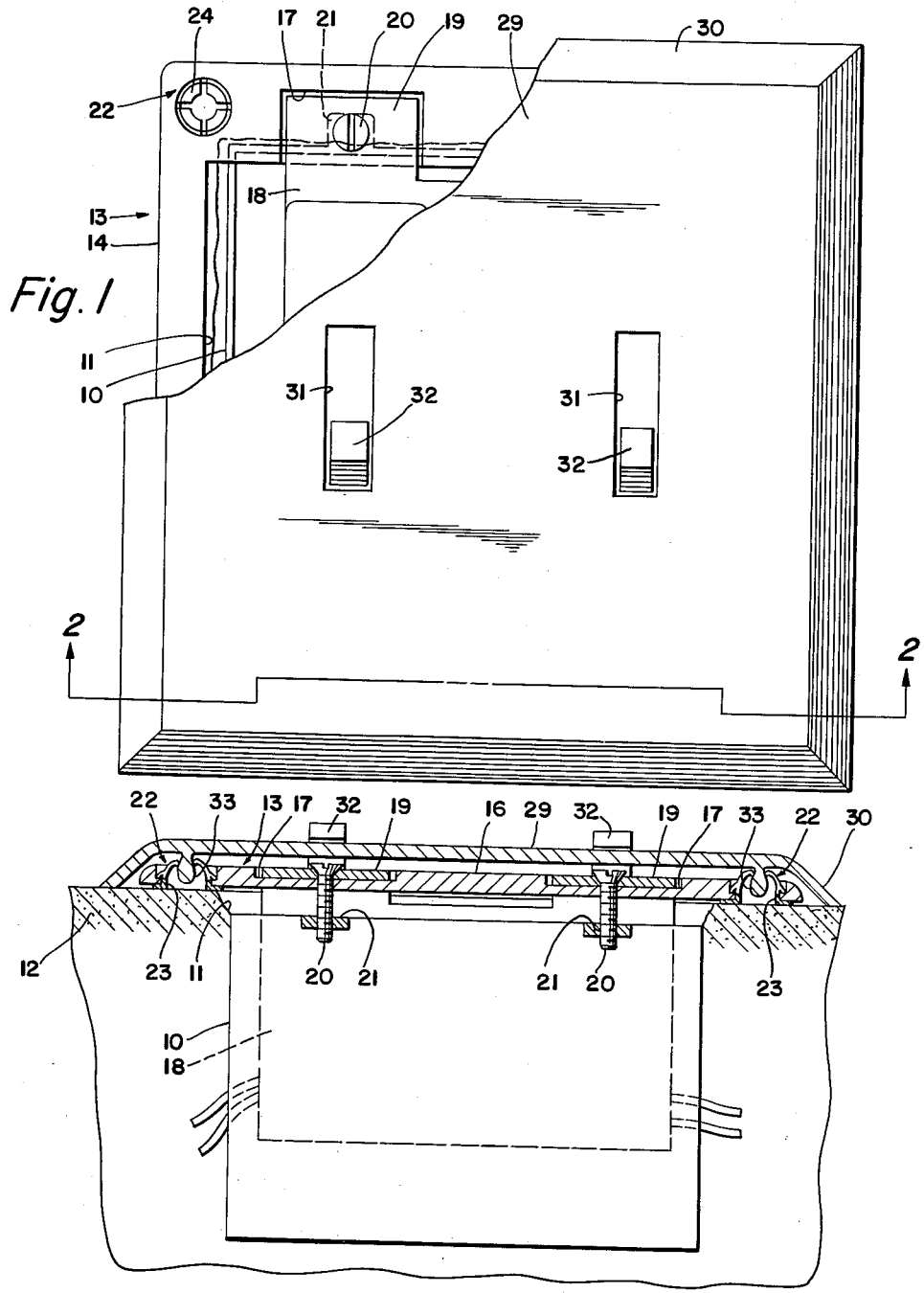

This invention relates to outlet box coverings and more particularly to wall outlet box coverings having no visible attaching devices and which may be affixed to existing wall outlet box installations.

Heretofore various devices have been proposed to cover electric fixtures contained in outlet boxes. For many years, electric fixtures contained in outlet boxes were concealed and protected by a cover plate which was affixed to the electric fixture by screws. In homes and apartments the usual electric fixtures that are mounted in outlet boxes are single or multiple gang toggle switches, female electric wall outlets, a combination of a toggle switch and an electric wall outlet, and a television master antenna connector. It is customary for the electrician to install these units by mounting an outlet box in an opening provided in a wall or baseboard and to insert the proper lead wires into the box through suitable openings therein. The desired electric fixture is then electrically connected to the lead wires and the fixture is securely mounted within the box by screws. A cover plate is placed over the wall opening and is fixed to the electric fixture by screws.

With this arrangement it is necessary for the electrician to employ a high degree of precision in mounting the outlet box within the wall. If the front of the outlet box is mounted so that the plane of the open end of the box is askew relative to the plane of the wall or baseboard, the cover plate and the electric fixture will also be askew. If the outlet box is mounted too deeply within the wall or baseboard, the visible mounting screw or screws will pull the cover plate inwardly toward the electric fixture and create an unsightly indentation on the surface of the cover plate. In such an instance, where the cover plate is fabricated from a brittle plastic, the plate may crack or break.

In the construction of new or the renovation of old structures, particular emphasis has been placed on the aesthetic value of the interior of the structure, and what may seem to be a relatively minor detail to the layman is often significant to the interior decorator. Attempts have been made, therefore, to provide cover plates for outlet boxes that match or properly contrast with the color of the wall on which the plate is mounted. In some respects these cover plates are aesthetically pleasing but the visible screw or screws that are employed to fix the plate to the electric fixture detract from the beauty of the installation. Cover plates for toggle switches have been developed that have no visible screws or other attaching devices, but these plates require the provision of a specially constructed switch and are not suited for installation over existing devices.

It is an object of this invention that overcomes many of the deficiencies of the prior art.

It is a more particular object of the present invention to provide a device for covering wall or baseboard outlet boxes which assures the proper installation of an electric fixture and the proper relationship between the cover plate and the wall or baseboard, even if the outlet box is improperly positioned within the wall or baseboard.

It is a further object of this invention to provide a device for covering an outlet box which has no visible screws and which can be installed over existing electric fixture installations.

The foregoing and various additional objects, features, and advantages of the invention will become apparent and more fully understood from the following detailed description, and from the accompanying drawings, in which:

FIGURE 1 is a plan view of a cover plate for a two-gang toggle switch and its associated locating wall mat according to the invention with portions of the cover plate broken away for clarity;

FIGURE 2 is a sectional view of the device of FIGURE 1, the plane of the section being indicated by the line 2—2 of FIGURE 1;

Figure 3:
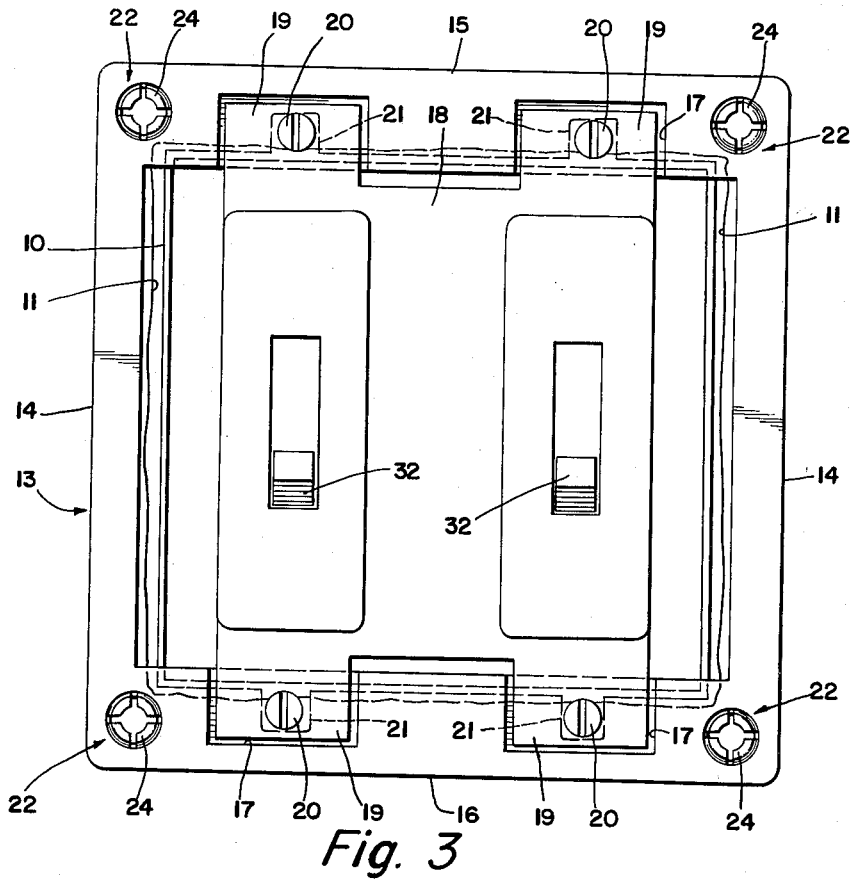
FIGURE 3 is a view similar to FIGURE 1, but showing the cover plate completely removed to show details of the wall mat.

Referring now to the drawings, an outlet box 10 is shown which is recessed in the conventional manner within an opening 11 in a wall 12. The outlet box 10 is of conventional construction having five sides and an opening for the installation of electric fixtures therein. A locating wall mat 13 is placed around the periphery of the opening 11 in the wall 12. The wall mat 13 comprises a flat frame having a pair of spaced side portions 14 and top and bottom portions 15 and 16, respectively. The top and bottom portions 15 and 16 are provided with recesses 17.

A standard two-gang toggle switch 18 is mounted to extend into the outlet box. The conventional switch 18 has mounting ears 19 extending therefrom, and these ears 19 are securely fastened in the recesses or recessed means 17 provided in the wall mat 13 by screws 20 which extend through the ears 19 and the recessed portions of the mat 13. The screws 20 also extend through projections 21 on the wall outlet box 10 to securely fasten the wall mat 13 and the switch 18 to the outlet box 10.

It should be appreciated that the conventional method of installing the switch 18 within the outlet box 10 is to fasten the ears 19 directly to the projections 21. If the outlet box is improperly installed so that the projections 19 lie in a plane which is askew in relation to the plane of the wall, the switch 18 will also be askew. The provision of the previously described wall mat 13 as an intermediate member between the switch 18 and the outlet box 10 always results in a properly mounted switch 18, since the wall mat 13 will fit flush against the wall 12 even if the outlet box 10 is askew.

At each corner of the wall mat 13 a gripping element 22 is provided. As may be seen more clearly in FIGURES 3 and 4, each gripping element comprises a cylindrical base 23 and a plurality of upwardly and inwardly extending fingers 24. Each gripping element 22 is mounted within a bore 25 provided at each corner of the wall mat 13 and is held in place by upper and lower flanges 26 and 27, respectively, which engage an annular protuberance 28 within each bore 25. Each gripping element 22 is mounted within a bore 25 by exerting pressure on the lower flange 27 until the upper flange 26 snaps over the protuberance 28. The gripping elements 22 are preferably fabricated from spring steel or other suitable resilient material. It is not necessary to mount the elements 22 in the manner shown and described. The elements 22 may be molded into the mat 13 if the mat is cast from metal or a suitable plastic.

The outlet box 10, switch 18, and wall mat 13 assembly is concealed by a cover plate 29. The plate 29 has a downwardly beveled edge 30 which firmly engages the wall 12 when the plate 29 is affixed to the wall mat 13 in a manner which will be described. Slots 31 are provided in the plate 29 to permit a pair of toggle buttons 32 of the switch 18 to extend outwardly from the plate 29.

The inner surface of each of the four corners of the plate 29 is provided with a tear-drop shaped mating element 33. Each mating element 33 is axially aligned with a gripping element 22. The plate 29 is secured to the wall mat 13 by aligning the mating elements 33 with the gripping elements 22 and pressing the plate 29 toward the wall 12. The fingers 24 of each gripping element 22 engage a mating element 33 and draw each mating element 33 and the plate 29 inwardly until the beveled edge 30 firmly engages the wall 12.

Figure 4:
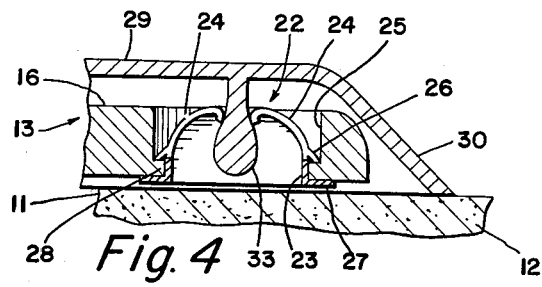
FIGURE 4 is a fragmentary sectional view on an enlarged scale showing details of one of the gripping elements and an associated mating element according to this invention.

A particularly advantageous feature of the invention is that the fingers 24 exert a constant pull on the mating elements 33 because of the conical outer surface of the elements 33. The resilient fingers 24 exert a constant compressive force on the elements 33 and tend to draw the plate 29 inwardly. This feature insures that the edge 30 will always be in contact with the wall even if the wall mat 13 is spaced from the plane of the wall, as is shown in FIGURE 4, due to surface irregularities beneath the wall mat 13 and/or if the outlet box 10 projects beyond the plane of the wall. This would not necessarily be the case if the elements 22 and 23 were designed to snap and lock in a single position.

The invention is not restricted to the slavish limitation of each and every one of the details described above which have been set forth merely by way of example with the intent of most clearly setting forth the teaching of the invention. Obviously, electric fixtures other than the two-gang toggle switch may be concealed by devices according to this invention. Furthermore, devices may be provided which change, eliminate, or add certain specific structural details without departing from the invention.

What is claimed is:

1. An outlet box cover assembly comprising a wall mat and a cover plate, said wall mat comprising a flat frame having a pair of spaced side portions and top and bottom portions, recessed means in said wall mat adapted for receiving the ears of an electric fixture and for mounting said wall mat to an outlet box recessed in an opening in a wall so that said wall mat will lie flush against the wall and so that said electric fixture will extend into said outlet box, a gripping element on said wall mat, said gripping element comprising a plurality of resilient, radially inwardly directed fingers, said cover plate comprising a flat plate having a downwardly beveled, wall-engaging edge portion, a tear-shaped mating element having a radially inwardly sloping surface fixed to said cover plate, said fingers of the gripping element engaging the inwardly sloping surface of said mating element to constantly pull the cover plate toward the wall mat and to pull said beveled edge into engagement with the wall adjacent to the periphery of said wall mat.

2. An outlet box cover assembly comprising a wall mat, a fixture, and a cover plate, said wall mat comprising a flat frame having a pair of spaced side portions and top and bottom portions, means defining a recessed portion in said top and bottom portions, ear means mounting the electric fixture to said recesed portion and means for mounting said wall mat to an outlet box recessed in an opening in a wall so that said wall mat will be flush against the wall and so that said electric fixture will extend into said outlet box, a gripping element on said wall mat, said gripping element comprising a cylindrical base portion and a plurality of resilient, radially inwardly directed fingers extending upwardly from said base portion, said cover plate comprising a flat plate having a downwardly beveled, wall-engaging edge portion, a tear-shaped mating element having a radially inwardly sloping surface fixed to said cover plate, said fingers of the gripping element engaging the inwardly sloping surface of said mating element to constantly pull the cover plate toward the wall mat and to pull said beveled edge into engagement with the wall adjacent to the periphery of said wall mat.

3. An outlet box cover assembly comprising a wall mat and a cover plate, said wall mat comprising a flat frame having a pair of spaced side portions and top and bottom portions, recessed means in said wall mat adapted for receiving the ears of an electric fixture, means for mounting a wall mat to an outlet box recessed in an opening in a wall so that said wall mat will be flush against the wall, said cover plate comprising a flat plate having a downwardly beveled, wall-engaging edge portion, a downwardly extending tear-shaped mating element having a radially inwardly sloping surface fixed to said cover plate, means fixed to said wall mat resiliently gripping the inwardly sloping surface of said mating element to constantly pull the cover plate toward the wall mat and to pull said beveled edge into engagement with the wall adjacent to the periphery of said wall mat.

4. An outlet box cover assembly comprising a wall mat and a cover plate, said wall mat comprising a flat frame having a pair of spaced side portions and top and bottom portions, ear means securing said wall mat to the fixture recessed in an opening in a wall so that said wall mat will be flush against the wall, said cover plate comprising a flat plate having a downwardly beveled, wall-engaging edge portion, a tear-shaped mating element having a radially inwardly sloping surface, a gripping element resiliently gripping the inwardly sloping surface of said mating element, one of said elements being fixed to said cover plate and the other of said elements being fixed to said wall mat to constantly pull the cover plate toward the wall mat and to pull said beveled edge portion into engagement with the wall adjacent to the periphery of said wall mat.

References Cited by the Examiner

UNITED STATES PATENTS

| | | | |
|---|---|---|---|
| 464,884 | 12/91 | Liming | 292—17 |
| 1,660,346 | 2/28 | Neal. | |
| 1,840,582 | 1/32 | Hubbell | 220—24 |
| 2,085,486 | 6/37 | Villani. | |
| 2,211,819 | 8/40 | Innis | 174—66 X |
| 2,439,000 | 4/48 | Hasenzahl | 24—217 |
| 2,668,998 | 2/54 | Tinnerman | 24—217 |

FOREIGN PATENTS 88,884    4/21    Switzerland.

JOHN F. BURNS, *Primary Examiner.*

JOHN P. WILDMAN, *Examiner.*